United States Patent [19]
Inomata

[11] Patent Number: 4,757,872
[45] Date of Patent: Jul. 19, 1988

[54] VEHICLE

[75] Inventor: Fumio Inomata, Saitama, Japan

[73] Assignee: Honda Giken Kogyo Kabushiki Kaisha, Tokyo, Japan

[21] Appl. No.: 887,240

[22] Filed: Jul. 21, 1986

[30] Foreign Application Priority Data

Jul. 19, 1985 [JP] Japan .................. 60-159465
Jul. 19, 1985 [JP] Japan .................. 60-159466

[51] Int. Cl.$^4$ .................. B60K 13/04; B60K 11/04
[52] U.S. Cl. .................. 180/291; 180/215; 180/69.4; 180/296; 180/309
[58] Field of Search .................. 180/215, 217, 225, 229, 180/681, 69.4, 291, 296, 309; 280/5 A, 5 R

[56] References Cited

U.S. PATENT DOCUMENTS 4,085,816  4/1978  Amagac et al. .................. 180/89.2
4,577,719  3/1986  Nomura et al. .................. 280/5 A

FOREIGN PATENT DOCUMENTS 120504  7/1984  Japan .................. 180/251

Primary Examiner—John J. Love
Assistant Examiner—Donn McGiehan
Attorney, Agent, or Firm—Lyon & Lyon

[57] ABSTRACT

In a vehicle in which front and rear wheels are suspended on a body frame and a power unit for driving the wheels via a drive shaft is carried on the central portion of the body frame, a fuel tank and an exhaust muffler are juxtaposed on left and right sides below the body frame in such a manner to be contained within the vertical projection plane of the body frame, and a heat insulating plate is interposed between the fuel tank and the exhaust muffler. The power unit is offset to one side in the widthwise direction of a vehicle body to define a space on the opposite side in which the drive shaft and exhaust pipes are disposed inside the outermost frame portion in vertically spaced relation to extend in the longitudinal direction of the vehicle body.

17 Claims, 3 Drawing Sheets

VEHICLE

BACKGROUND OF THE INVENTION

1. Field of the Invention

The present invention relates to a vehicle in which respective pairs of front and rear wheels can be driven and which is designed so that a rider may sit astride the vehicle.

2. Description of the Prior Art

There is known a vehicle which is generally travelable on a road such as a rough road, damp road, snowy road, etc., (Japanese Patent Application Laid-open No. 421/83). A vehicle is also well known in which front and rear wheels are mounted respectively in a pair and all the wheels can be driven to enhance the driving performance.

Because the above-described vehicles may travel on a road such as a rough road, damp road, snowy road, etc., it is required to set the gravity center thereof at a lower point and to protect a fuel tank and an exhaust muffler by a durable body frame, and further to prevent the fuel tank from being influenced by the exhaust heat emitted from an exhaust system in a power unit. With such conventional vehicles, however, these requirements could not be necessarily satisfied.

In conventional vehicles, a drive shaft of a power unit carried on the central portion of the body frame is disposed to extend longitudinally of the body frame and has its front and rear ends connected to a front wheel driving system and a rear wheel driving system, respectively. An exhaust pipe leading from the engine of the power unit also extends longitudinally of the body frame. Therefore, it is impossible from the viewpoint of space to locate the drive shaft and the exhaust pipe inside the outermost frame portion of the body edge without any hindrance to the power unit and other parts.

SUMMARY OF THE INVENTION

It is an object of the present invention to provide a vehicle in which parts carried on a body frame can be effectively protected from an obstacle during travelling of the vehicle and mutual interference between the parts can be possibly reduced.

To accomplish the above object, according to a first aspect of the present invention, there is provided a vehicle comprising a body frame, front and rear wheels suspended on the body frame, and a power unit carried on the central portion of the body frame, wherein a fuel tank and an exhaust muffler connected with an exhaust system of the power unit are juxtaposed at the right and left sides below the body frame and located within a vertical projection plane of the body frame, and a heat insulating plate is interposed between the fuel tank and the exhaust muffler.

With such arrangement, the gravity center of the whole vehicle can be set at a lower point to enhance the travelling performance of the vehicle and further, the fuel tank and the exhaust muffler can be protected from foreign matters by the durable body frame.

Since the heat insulating plate is interposed between the fuel tank and the exhaust muffler, the radiant heat emitted from the exhaust muffler is intercepted by the heat insulating plate and thus, cannot be transmitted to the fuel tank so that inconveniences due to the heating of the fuel tank will not occur.

In addition, according to a second aspect of the present invention, there is provided a vehicle comprising a body frame, front and rear wheels suspended respectively in a pair on the body frame, and a power unit for driving the front and rear wheels together through a drive shaft, wherein the power unit is disposed offset to one side in the widthwise or lateral, direction of the body frame to define a space on the other side, whereby exhaust pipes and the drive shaft of the engine of the power unit are mounted in said space in a vertically spaced relation to each other to extend in the longitudinal direction of the vehicle and are located inside the widthwise outermost frame portion of the body frame.

Thereupon, the exhaust pipe and the drive shaft can be located with spatial leeway within the vertical projection plane of the body frame. Thus, the vehicle can be made compact as a whole and further, the layout of the power unit and other parts and their mounting to the vehicle body can be done easily. Moreover, it is possible to reduce the heat emitted from the exhaust pipe and reaching the rider.

The above and other objects, features and advantages of the invention will become apparent from reading of the following description taken in conjunction with the accompanying drawings.

BRIEF DESCRIPTION OF THE DRAWINGS

The drawings illustrates one embodiment of the present invention wherein;

FIG. 4 is a sectional view taken along the line IV—IV of FIG. 3.

DESCRIPTION OF THE PREFERRED EMBODIMENTS

Figure 1:
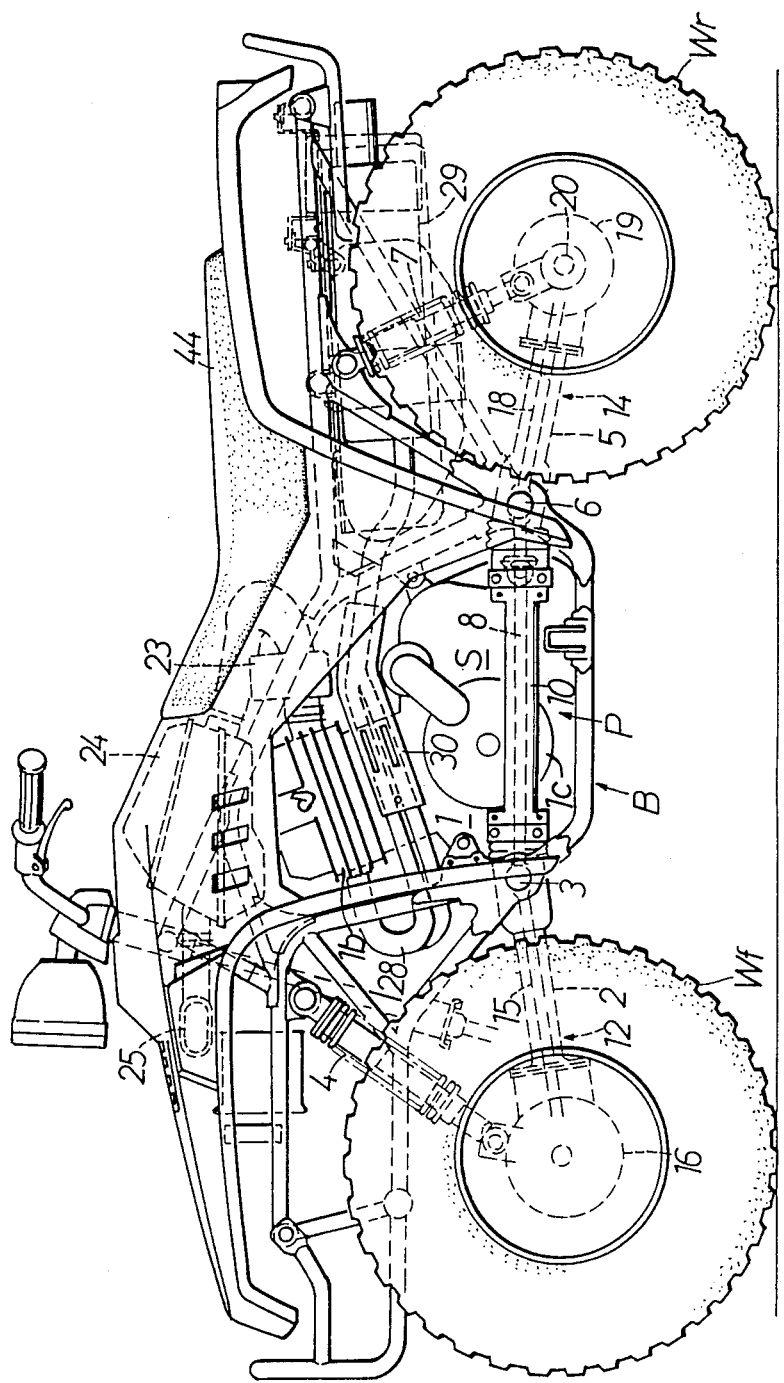
FIG. 1 is a side view of a vehicle according to the present invention.
Figure 2:
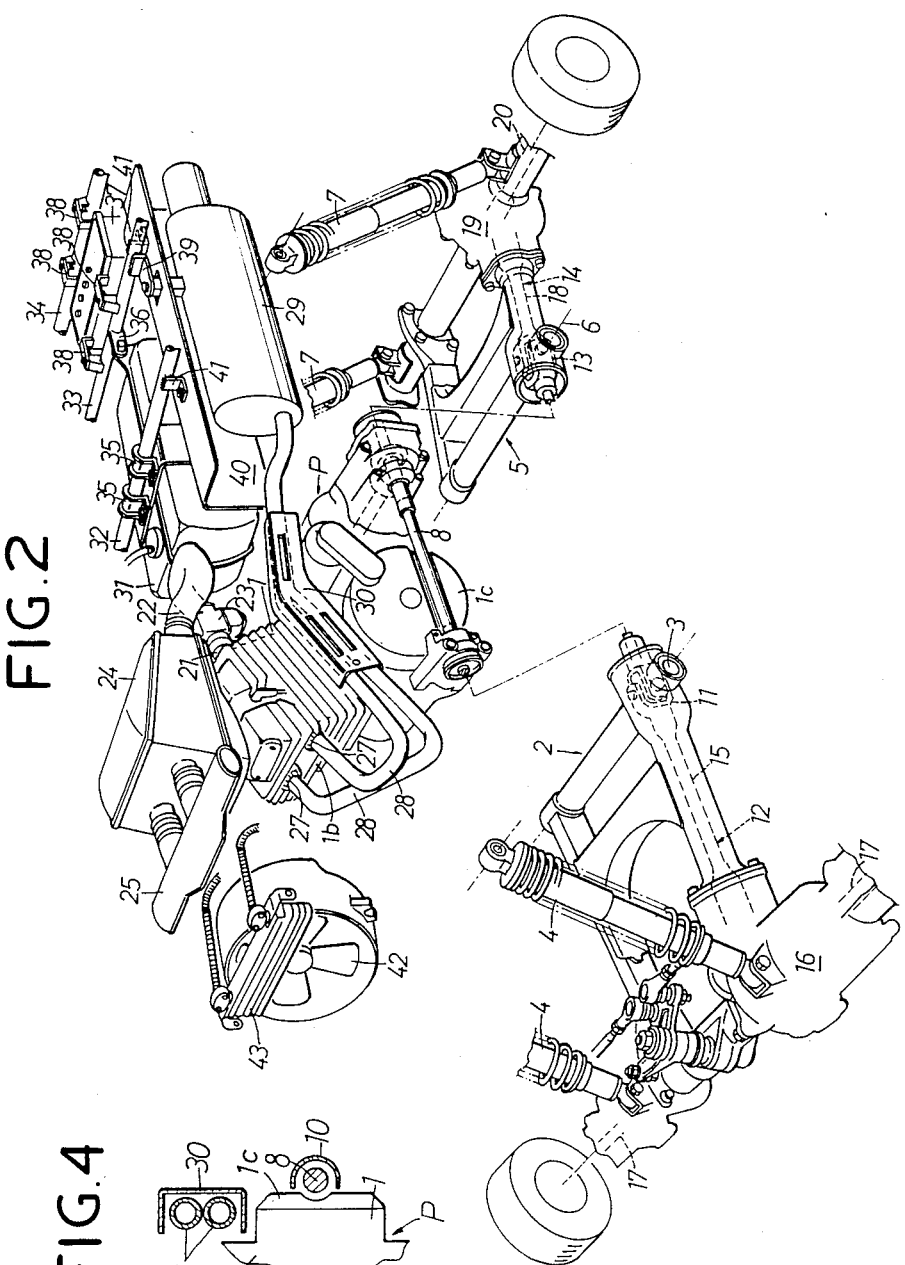
FIG. 2 is an exploded perspective view of the details of the vehicle.

The present invention will now be described by way of one embodiment with reference to the accompanying drawings.

A power unit P including an engine 1 is carried on the central portion of a body frame B of a saddle riding type four-wheel drive vehicle, and the engine 1 is disposed laterally (with its crank shaft extending in a direction perpendicular to the longitudinal axis of the body frame B).

A front swingable arm 2 is pivoted at 3 below the leading portion of the body frame B for swinging movement in the vertical direction, with its leading portion swingably suspended on the leading or front portion of the body frame B through a pair of front cushions 4. A pair of steerable front wheels Wf and Wf are suspended on a shaft at the left and right of the front swingable arm 2. A rear swingable arm 5 is also pivoted at 6 below the trailing or rear portion of the body frame B for swinging movement in the vertical direction, with its trailing portion swingably suspended on the trailing or rear portion of the body frame B through rear cushions 7. A pair of rear wheels Wr and Wr are suspended on a shaft at the left and right of the rear swingable arm 5. Each of the front and rear wheels Wf and Wr is provided with an extremely low pressure balloon tire.

Figure 3:
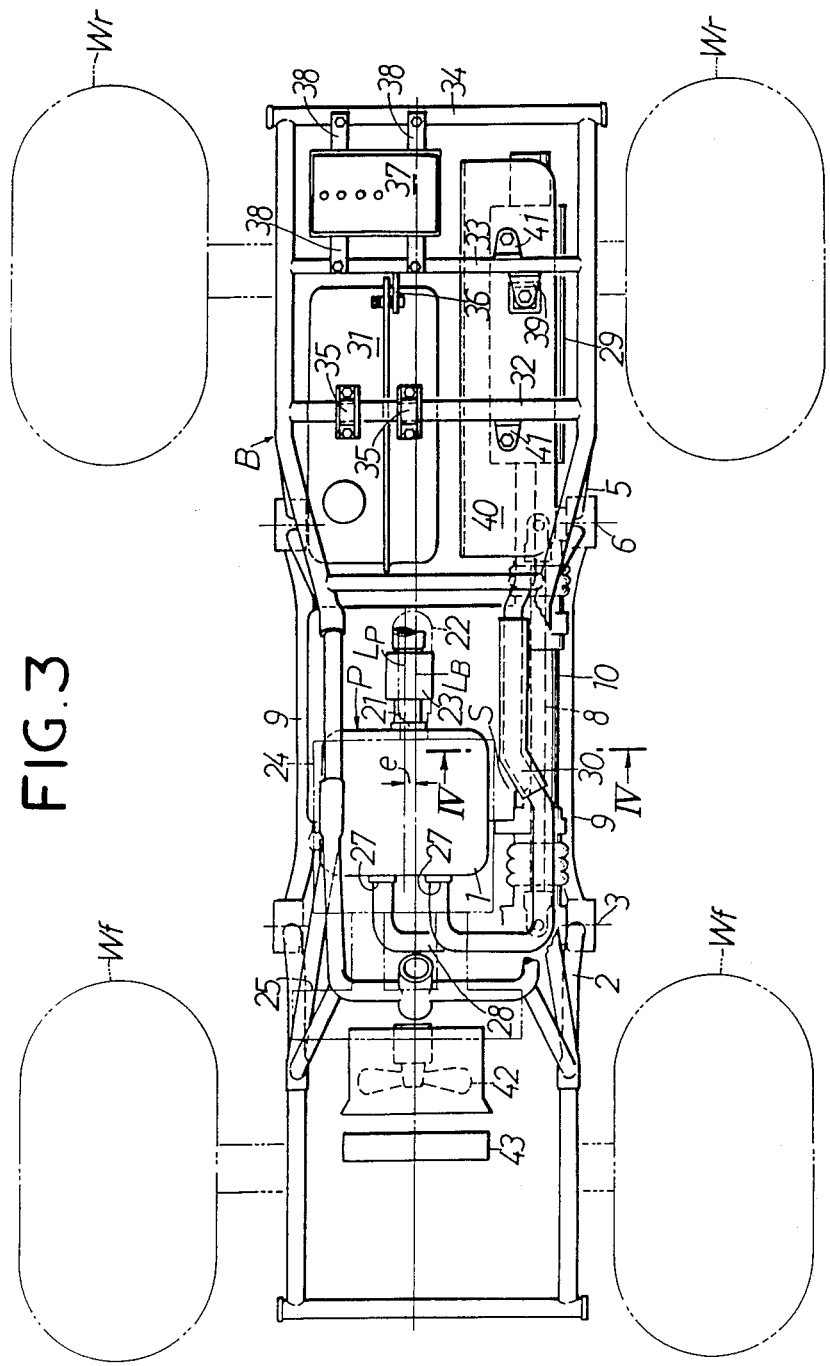
FIG. 3 is a plan view of a body frame of the vehicle.

As shown in FIG. 3, the longitudinal center line $L_P$ of the power unit P is offset by an amount e to one lateral side (to the right in FIG. 3) of the longitudinal central axis $L_B$ of the body frame B, and at the side opposite to the offset side (at the left in FIG. 3), there is defined a relatively wide space S.

The power unit P has a drive shaft 8 which extends forwardly and rearwardly at the side opposite to the offset side of the power unit P and sideways a crank case 1c substantially in parallel to the longitudinal center line $L_P$ of the power unit P and which is located inside the outermost frame portion 9 of the body frame B. The outer side of the drive shaft 8 is surrounded by a cover 10 having a semicircular section, as shown in FIG. 4.

The drive shaft 8 is operatively connected at its fore end to a front wheel transmission system 12 through a universal joint 11 and at its rear end to the rear wheel transmission system 14 through a universal joint 13. The front wheel transmission system 12 includes a front propeller shaft 15 which is located within the front swingable arm 2 and connected at its rear end to the drive shaft 8 and at its fore end through a differential 16 to the left and right front wheel driving shafts 17 and 17 connected with the left and right front wheels Wf and Wf, while the rear wheel transmission system includes a rear propeller shaft 18 which is connected at the fore end to the drive shaft 8 and at its rear end through a decelerating mechanism 19 to the left and right wheel driving shafts 20 and 20 connected with the left and right wheels Wr and Wr.

The engine 1 of the power unit p has an intake port 21 opened in the rear surface thereof. Connected to the intake port 21 via a carburetter 23 is an intake pipe 22 which is curved to extend forwardly and communicate with an outlet of the air cleaner 24 disposed on the engine 1. An air duct 25 is disposed in front of the air cleaner 24 and connected to an inlet of the air cleaner 24.

In addition, an exhaust pipe 28 is connected to each of two exhaust ports 27 opened in the front surface of the engine 1. These exhaust ports 28 are curved into a U-shaped configuration to extend in the direction opposite to the direction of offset of the power unit and run in the longitudinal direction of and through the aforesaid. The pipes are the united into a single pipe which is, in turn, connected to an exhaust muffler 29.

The exhaust pipes 28 run sideways a cylinder block 1b and substantially just above the drive shaft 8 of the power unit P and the exterior of the middle portion of each exhaust pipe 28 is covered with a protector 30 having a square or rectangular cross-section with one side omitted, as shown in FIG. 4. The drive shaft 8 of the power unit P and the exhaust pipes 28 are disposed in the space S inside the outermost frame portion 9.

Below that portion, of the body frame B, which is behind the power unit P, a fuel tank 31 is disposed at one side with respect to the longitudinal central axis $L_B$ of the body frame B, i.e., at the right with respect to the direction of forward travelling of the vehicle and is hung from cross members 32 and 33 at the rear portion of the body frame B through brackets 35, 35 and 36. Moreover, a battery 37 is disposed behind the fuel tank 31 and also hung by the cross member 33 and another cross member 34 at the rear portion of the body frame B through brackets 38 . . . .

Below the body frame B, the exhaust muffler 29 is disposed at the other side with respect to the longitudinal central axis $L_B$ of the body frame B, i.e., at the left with respect to the direction of forward travelling of the vehicle in parallel to the fuel tank 31 and the battery 37 and is also hung from the cross member 33 at the rear portion of the body frame B through a bracket 39.

A heat insulating plate 40 having a reverse L-shaped cross section is interposed between the fuel tank 31 and battery 37 and the exhaust muffler 29, and is hung from the cross members 32 and 33 at the rear portion of the body frame B through brackets 41 and 41. The heat insulating plate 40 extends through between the fuel tank 31 and the exhaust muffler 29 over the entire length of them to intercept the radiant heat emitted from the exhaust muffler 29 from being transmitted to the fuel tank 31.

All the fuel tank 31, the battery 37 and the exhaust muffler 29 lie just below the rear portion of the body frame B and have no parts protruding outside the vertical projection plane of the body frame B.

In Figures, the reference numeral 42 is a cooling fan, 43 being an oil cooler and 44 being a seat.

Description will now be made of the operation of this embodiment.

Now, if a rider gets on the vehicle astride the seat 44 and starts up the power unit P, the output of the power unit P can be transmitted to the front wheel transmission system 12 and the rear wheel transmission system 14 through the drive shaft 8 to drive the front and rear wheels Wf, Wf, Wr and Wr together, thus allowing the vehicle to travel.

The power unit P is disposed offset to one side the widthwise direction of the body frame B to define the relative wide space at the other side with respect to the widthwise direction of the power unit P, so that the exhaust pipes 28 and the drive shaft 8 of the engine 1 in the power unit P can be disposed to run parallel to each other; in the longitudinal direction of the vehicle and with a vertical spacing therebetween, and all of them can be located with spatial leeway inside the outermost frame portion of the body frame.

Because the fuel tank 31 and the exhaust muffler 29 each having a relative large weight and volume are located below the rear portion of the body frame B, the gravity center of the vehilcle can be reduced. In addition, since the fuel tank 31 and the exhaust muffler 29 lie in the vertical projection plane of the body frame B, they are protected by the durable body frame B. Further, the heat insulating plate 40 interposed between the fuel tank 31 and the exhaust muffler 29 serves to intercept the radiant heat emitted from the exhaust muffler 29 and therefore, the fuel tank kept from being heated by such heat.

What is claimed is:

1. A vehicle comprising a body frame, front and rear wheels suspended on said body frame, and a power unit carried on a central portion of said body frame, a fuel tank and an exhaust muffler leading from an exhaust system of said power unit, wherein said fuel tank and said exhaust muffler are juxtaposed at right and left sides below said body frame and located within a vertical projection plane of the body frame, a heat insulating plate is interposed between said fuel tank and said exhaust muffler, and wherein said body frame includes cross members extending in a widthwide direction of the vehicle, and said fuel tank and said exhaust muffler are hung by said cross members.

2. A vehicle according to claim 1, wherein said heat insulating plate has an L-shaped section and covers one side surface, close to the fuel tank, and an upper surface of said exhaust muffler.

3. A vehicle according to claim 1, wherein, behind said fuel tank, a battery is supported on said body frame within said projection plane, and said heat insulating plate extends up to a portion between said exhaust muffler and said battery.

4. A vehicle according to claim 1, wherein said power unit is disposed offset to the same side as said fuel tank in the widthwise direction of the vehicle, and at a side opposite to the offset direction of said power unit, an exhaust pipe connected to said exhaust muffler is disposed sideways of said power unit.

5. A vehicle comprising a body frame, front and rear wheels on the body frame, a power unit carried on a central portion of the frame, a fuel tank, an exhaust muffler, means for carrying the rear wheels pivotably supported on the body frame, and a pair of cushion means between said rear wheel carrying means and said body frame, wherein said fuel tank and said exhaust muffler are disposed below the body frame at a position behind said power unit and between said pair of cushion means so as to be located within a vertical projection plane on the body frame, and a heat insulating plate is interposed between said fuel tank and said exhaust muffler.

6. A vehicle according to claim 5, wherein a battery is supported on said body frame behind said fuel tank and within said projection plane.

7. A vehicle according to claim 5, wherein said vehicle is of a saddle riding type.

8. A vehicle comprising a body frame, respective pairs of front and rear wheels on the body frame, and a power unit including an engine for driving the front and rear wheels via a drive shaft, wherein said power unit is disposed offset to one side in a widthwise direction of the body frame to provide a space on that side of the power unit which is opposite to the offset direction, said drive shaft is extended through said space in a longitudinal direction of the frame and said power unit has an exhaust pipe disposed to run longitudinally of the body frame through said space with a vertical spacing from said drive shaft, said drive shaft and said exhaust pipe being located inside a lateral outermost edge of the body frame.

9. A vehicle according to claim 8, wherein said engine has a crank shaft disposed in the widthwise direction of the frame and said drive shaft receives a drive force from the engine at a position sidewardly of the power unit.

10. A vehicle according to claim 8, wherein said exhaust pipe is located above said drive shaft.

11. A vehicle according to claim 8 or 10, wherein said engine has a cylinder block and a crankcase and said exhaust pipe passes sidewardly of said cylinder block while said drive shaft passes sidewardly of said crankcase.

12. A vehicle according to claim 8, wherein said exhaust pipe is connected to a muffler which is located rearwardly of and substantially in the same horizontal plane as the pipe.

13. A vehicle according to claim 12, wherein a fuel tank is supported on the body frame behind said power unit and sidewardly of the muffler.

14. A vehicle according to claim 8, wherein said drive shaft has front and rear ends and is connected at its front end to a front wheel transmission system and at its rear end to a rear wheel transmission system.

15. A vehicle comprising a body frame, front and rear wheels suspended on said body frame, and a power unit carried on a central portion of said body frame, wherein a fuel tank and an exhaust muffler connected with an exhaust system of said power unit are juxtaposed at right and left sides on a lower portion of said body frame and contained within a vertical projection plane of the body frame, and a heat insulating plate is interposed between said fuel tank and said exhaust muffler, said heat insulating plate having an L-shaped section including a first arm positioned intermediate said fuel tank and said exhaust muffler and a second arm covering the upper surface of said exhaust muffler.

16. A vehicle comprising a body frame, front and rear wheels suspended on said body frame, and a power unit carried on a central portion of said body frame, wherein in juxtaposed relation within a vertical projection plane on a lower portion of said body frame are a fuel tank and a battery supported on one side of said body frame and an exhaust muffler on the other side thereof, and a heat insulating plate extending between said fuel tank and said battery on said one side and said exhaust muffler on said other side.

17. A vehicle comprising a body frame, front and rear wheels suspended on said body frame, a power unit carried on a central portion of said body frame, a fuel tank and an exhaust muffler connected with an exhaust system of said power unit juxtaposed at right and left sides on a lower portion of said body frame and contained within a vertical projection plane thereof, and a heat insulating plate interposed between said fuel tank and said exhaust muffler, said power unit being offset to the same side of said body frame as said fuel tank and an exhaust pipe connected between said power unit and said exhaust muffler extending along the side of said body frame opposite that containing said offset power unit.

* * * * *